(12) United States Patent
Mattheis

(10) Patent No.: US 8,201,964 B2
(45) Date of Patent: Jun. 19, 2012

(54) HANDHELD FLASHLIGHT WITH RETRACTABLE LEASH

(76) Inventor: Steven G. Mattheis, Jackson, WY (US)

( * ) Notice: Subject to any disclaimer, the term of this patent is extended or adjusted under 35 U.S.C. 154(b) by 0 days.

(21) Appl. No.: 12/824,867

(22) Filed: Jun. 28, 2010

(65) Prior Publication Data

US 2010/0302767 A1    Dec. 2, 2010

Related U.S. Application Data

(63) Continuation-in-part of application No. 11/351,769, filed on Feb. 10, 2006, now Pat. No. 7,771,076.

(60) Provisional application No. 60/652,450, filed on Feb. 11, 2005, provisional application No. 60/702,185, filed on Jul. 25, 2005.

(51) Int. Cl.
    *F21L 4/02* (2006.01)
    *A01K 27/00* (2006.01)
(52) U.S. Cl. .......................... 362/184; 362/253; 119/796
(58) Field of Classification Search .................. 362/184, 362/253; 119/796
    See application file for complete search history.

(56) References Cited

U.S. PATENT DOCUMENTS

| | | | |
|---|---|---|---|
| 4,501,230 A * | 2/1985 | Talo | 119/796 |
| 5,887,550 A * | 3/1999 | Levine et al. | 119/796 |
| 6,003,472 A * | 12/1999 | Matt et al. | 119/796 |
| 6,148,773 A | 11/2000 | Bogdahn | |
| 6,405,683 B1 | 6/2002 | Walter et al. | |
| D519,246 S | 4/2006 | Plewa | |
| 7,168,393 B2 | 1/2007 | Bogdahn et al. | |
| D573,314 S | 7/2008 | Plewa | |
| D574,980 S | 8/2008 | Mattheis | |
| D574,981 S | 8/2008 | Mattheis | |
| D610,752 S | 2/2010 | Roediger | |
| 7,771,076 B1 | 8/2010 | Mattheis | |
| 7,896,281 B2 | 3/2011 | Bleshoy | |
| 2005/0007769 A1* | 1/2005 | Bonzer et al. | 362/157 |

* cited by examiner

*Primary Examiner* — Diane Lee
*Assistant Examiner* — Sean Gramling
(74) *Attorney, Agent, or Firm* — Fraser Clemens Martin & Miller LLC; William J. Clemens

(57) ABSTRACT

A handheld flashlight has a housing with a handle for accepting a user's hand to grip and hold the housing, a first light source positioned in the housing for projecting a beam of light into a distance in front of the user, a second light source positioned in the housing for projecting a beam of light toward a surface proximate the user's feet and a tail light positioned in the housing to provide additional visibility of the user to people who approach the user from behind. A switch energizes and deenergizes the lights. A spring biased reel is rotatably mounted in said housing and a leash is wound on the reel and extends from the housing such that a portion of the leash can be extended from the housing and the reel will automatically retract the extended leash portion.

17 Claims, 4 Drawing Sheets ns
HANDHELD FLASHLIGHT WITH RETRACTABLE LEASH

CROSS-REFERENCE TO RELATED APPLICATION

This application is a continuation-in-part of the co-pending U.S. patent application Ser. No. 11/351,769 filed Feb. 10, 2006, which application is incorporated by reference in its entirety and claims the benefit of U.S. Provisional Application Ser. No. 60/652,450 filed on Feb. 11, 2005, which is incorporated by reference in its entirety, and the benefit of U.S. Provisional Application Ser. No. 60/702,185 filed on Jul. 25, 2005, which is incorporated by reference in its entirety.

FIELD OF THE INVENTION

The present invention relates to a handheld light emitting device; more particularly, to a handheld flashlight combined with a retractable leash.

BACKGROUND OF THE INVENTION

A typical handheld flashlight includes a substantially cylindrical handle that is gripped by a user's hand. The flashlight has a single light emitting source at one end that receives power from a dry cell battery or a series of dry cell batteries that are positioned within the handle.

While a standard flashlight has many useful purposes, it is difficult to grip the handle on a flashlight for long periods of time because the user's grip fatigues due to the unnatural position of the user's hand about the flashlight handle. Also, many of the handles have a narrow diameter and are difficult to grip. Further, the weight of the dry cell batteries positioned within the handle cause the user's grip to fatigue over time.

Another issue that arises when using a standard flashlight in unfamiliar terrain is that the user typically prefers to have a beam shining in a forward direction for a distance to allow the user to see and avoid potential hazards. While wanting to see what is in front of the user, the user also prefers to have a beam illuminating the terrain near the user's feet so that the user does not slip, fall or trip over an unseen obstacle. While using a single beam flashlight, the user must alternate between illuminating the terrain in the distance and illuminating the ground near the user's feet. Over time this repetitive motion can become tiresome to the flashlight user.

While walking a pet, typically a dog, a person may use a leash especially where there is a "leash law". Some leashes include a retracting device including a spring biased spool upon which the leash is wound. A lever or button can be provided to control features such as automatic rewinding of the leash and holding the leash at a selected extended length.

When walking a dog at night, the person typically holds a flashlight in one hand and the leash in the other hand. Therefore, the person does not have a hand available for holding other objects such as a pet waste collection bag and tool, or an umbrella for use during inclement weather.

SUMMARY OF THE INVENTION

The present invention includes a light emitting apparatus having a housing with a substantially elliptical perimeter and an elongated aperture for accepting the digits of a user's hand. A first light emitting source is positioned in the housing for projecting a beam of light into a distance in front of the user. A second light emitting source is positioned in the housing for projecting a beam of light toward a surface proximate the user's feet.

The housing includes a handle between the aperture and the substantially elliptical perimeter for gripping the light emitting apparatus and wherein the elliptical perimeter distributes a weight of the light emitting apparatus substantially evenly across the user's grip to prevent the user's grip from becoming fatigued.

The housing encloses a spring biased reel upon which is wound a leash having one end fixed to the spool and an opposite end extending through an aperture in the housing and terminating in a hook for attaching to a pet collar.

DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The U.S. patent application Ser. No. 11/351,769 is hereby incorporated herein by reference.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
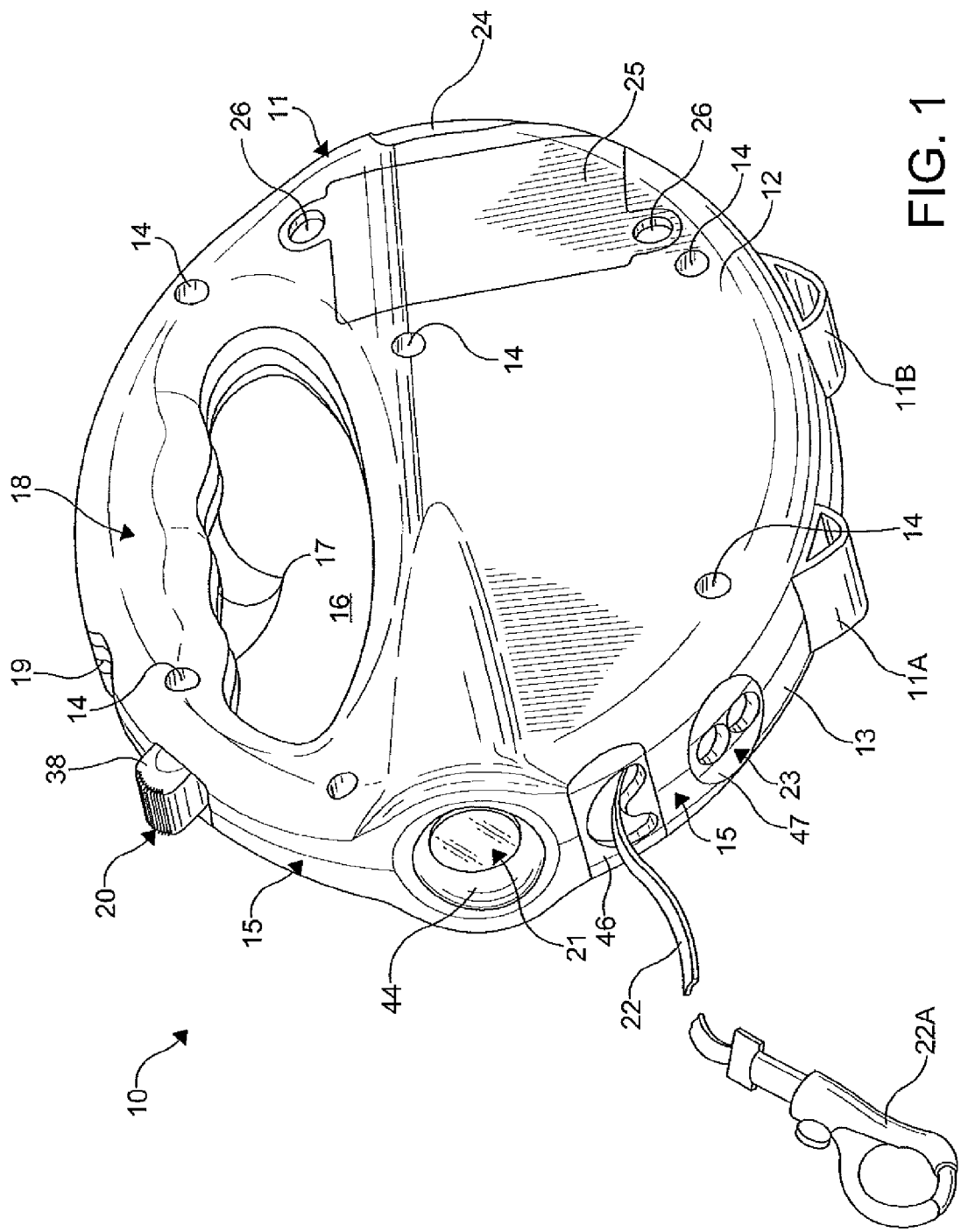
FIG. 1 is a perspective view of the handheld flashlight with retractable leash according to the present invention.

A handheld flashlight of the present invention is generally illustrated at 10 in FIG. 1. The handheld flashlight 10 has a housing 11 that is constructed of a left half 12 and a right half 13. The housing halves 12, 13 are held together by a plurality of fasteners 14. The housing 11 has a generally elliptical shape in side elevation with substantially flat side surfaces connected by a peripheral wall 15. However, the side surfaces may have other configurations besides being substantially flat. While an elliptical shape is preferred, other configured flashlights are within the scope of the present invention including a polygonal perimeter or circular perimeter. The elliptical perimeter substantially evenly distributes the weight of the flashlight along a length which allows a user of the flashlight to grip and use the flashlight for an extended period of time without causing the user's grip to become fatigued.

The left and right halves 12, 13 are preferably constructed from a light weight plastic or polymeric material that is substantially impact resistant and able to withstand an impact when accidentally dropped. However other materials of construction are within the scope of the present invention.

The left and right halves 12, 13 have an internal aperture 16 formed therethrough that is of generally oval shape. The internal aperture 16 is shaped to accept the fingers or digits of a human hand. A top edge of the aperture 16 includes a plurality of inwardly extending portions 17 that define a gripping surface. The user positions his/her fingers into the aperture 16 while positioning a palm at the peripheral wall 15 above the portions 17. Thus, the portion of the housing 11 between the upper edge of the aperture 16 and the adjacent peripheral wall 15 defines an integral handle 18 for gripping the flashlight 10.

The left and right housing halves 12, 13 each include a front foot 11A and a back foot 11B extending outwardly from a bottom portion of the peripheral wall 15. The front and back feet 11A, 11B allow the flashlight 10 to be positioned in a selected position on a flat surface without rolling or tipping to either side. The feet 11A, 11B allow the user to not only use the flashlight 10 for an athletic activity such as walking, hiking or running, but also allow the flashlight 10 to be used for other activities where a stationary flashlight is required.

Various components of the handheld flashlight 10 are mounted in the peripheral wall 15. A pushbutton switch 19 is positioned within an aperture formed in the wall 15 at the handle 18. The switch 19 is proximate the user's thumb when the hand is gripping the handle 18. The switch 19 is preferably a multi-positional switch for controlling a plurality of lights as discussed below.

Moving in a counterclockwise direction about the housing 11 shown in FIG. 1, an end of a lever 20 extends through an aperture formed in the peripheral wall 15. The lever 20 also is proximate the user's thumb for controlling a leash as discussed below.

A first light emitting source 21 is mounted in an aperture formed in the peripheral wall 15. The light source 21 is turned on and off by the switch 19. The first light emitting source 21 is preferably a light emitting diode (LED) device having a beam that is dispersed through a lens. However, the lens is not necessary to practice the present invention. Preferably, the first light emitting source 21 is a flood light aimed forward for a distance to allow the user to see and avoid potential hazards. The LED device 21 may include one or more LEDs or light bulbs. The flood light 21 projects a broad beam of light that illuminates the ground or terrain for a substantial distance.

Below the light 21 is a leash 22 extending from an aperture formed in the peripheral wall 15 and terminating in a hook 22A for attachment to a collar worn by an animal. The leash 22 extends from and retracts into the housing 11 utilizing a spring biased reel or spool as described below. Pushing the lever 20 in a forward direction toward the light 21 locks the leash 22 in place. Pulling the lever 20 in a rearward direction frees the leash 22 for extension and retraction.

The switch 19 also controls a second light emitting source 23 mounted below the leash aperture. The second light emitting source 23 is positioned to project two beams of light at a substantially 45° angle to each other between a horizontal direction of the light 21 and a vertical direction. However, other configurations of the two beams are within the scope of the present invention. The second light emitting source 23 preferably projects a narrow, high intensity beam proximate the user's feet. A cluster of more than one LED or light bulb which act together to form the narrow, intense beam can be used. Thus, the user does not have to maneuver the flashlight 10 to shine the beam of the light 21 between the user's feet and out in the distance.

The switch 19 further controls a third light emitting source 24 mounted in the peripheral wall 15 opposite the light 21. The light 24 is a tail light that allows individuals approaching the user from behind to ascertain the user's position. The light 24 is useful in making the user visible whether the user is being approached by a pedestrian or a person in a vehicle. The tail light 24 is preferably a pair of red LEDs covered by a clear lens. However, a white LED can be used with a red transparent lens. The tail light 24 preferably blinks to attract attention to the light. While an LED is typical, other illuminating devices are within the scope of the present invention. Further, a transparent lens having a color other than a red lens is also within the scope of the present invention as is no lens.

A multi-positionable pushbutton switch is preferred for the switch 19. A first actuation turns on the first light 21. A second actuation of the switch 19 turns on the second light 23 while the first light 21 remains on. A third actuation of the switch 19 turns on the third light 24 while the first light 21 and the second light 23 remain on. A fourth actuation of the switch 19 turns off all of the lights. Other types of switches can be used to obtain the same functionality or to control the lights in different combinations of "on" and "off" within the scope of the present invention.

FIG. 1 also shows a battery cavity cover 25 positioned to close a recess or cavity (not shown) formed in the housing left half 12 for retaining a plurality of suitable batteries (not shown) that provide electrical power to the lights through the switch 19. The cover 25 is releasably retained by a pair of fasteners 26. The flashlight 10 is typically powered with three AA batteries to minimize the weight of the flashlight. However, the flashlight 10 may use one or more batteries that may be a different size than an AA battery.

Figure 2:
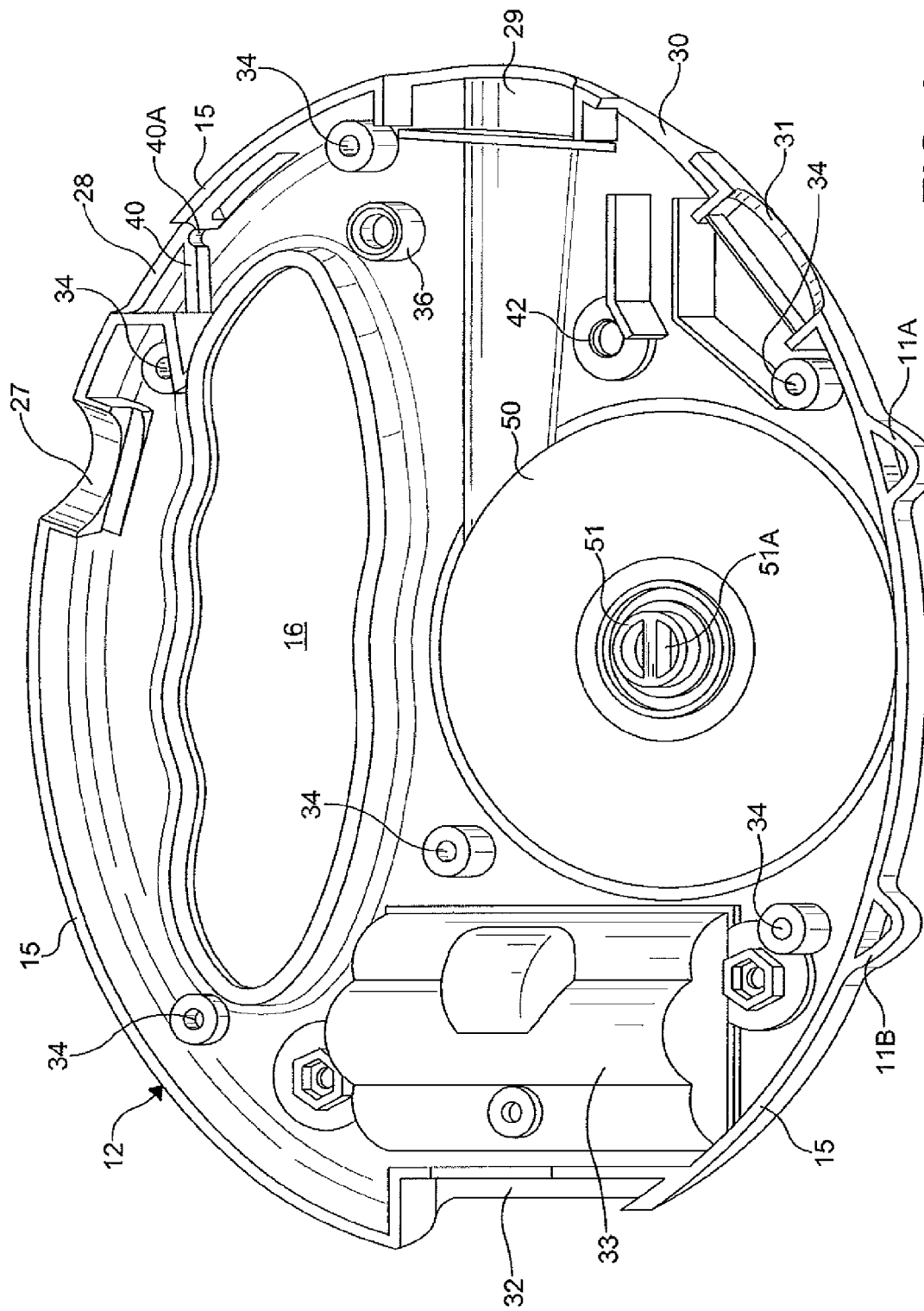
FIG. 2 is an elevation view of the interior of the left half of the housing shown in FIG. 1.
Figure 3:
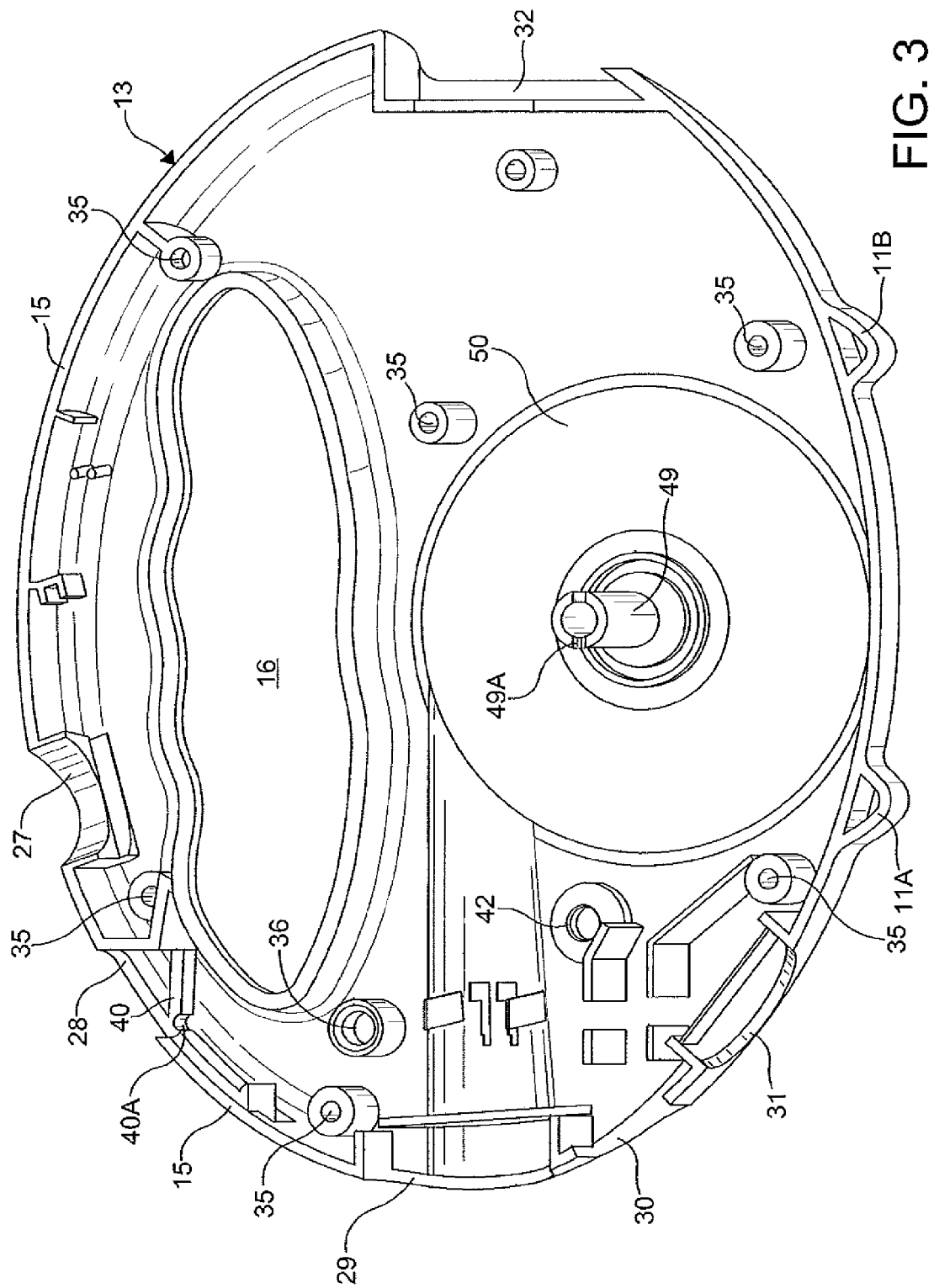
FIG. 3 is an elevation view of the interior of the right half of the housing shown in FIG. 1.

As shown in FIGS. 2 and 3 the housing left half 12 and the housing right half 13 each include one half of the peripheral wall 15. Formed in each half of the peripheral wall 15 are the following aperture portions: pushbutton aperture 27; lever aperture 28; first light aperture 29; leash aperture 30; second light aperture 31; and third light aperture 32. As shown in FIG. 2, an interior wall 33 of the battery cavity extends inwardly from the inner surface of the housing left half 12. Also formed in the side wall of the housing left half 12 are a plurality of apertures 34 for receiving the fasteners 14. The housing right half 13 has a corresponding plurality of posts 35 extending from an interior surface of the side wall for threadably receiving the fasteners 14 in bores thereby attaching the two halves of the housing 11 together. However, other fastening devices such as glue, adhesive and a snap fit are also within the scope of the present invention for retaining the halves 12, 13 together.

Figure 4:
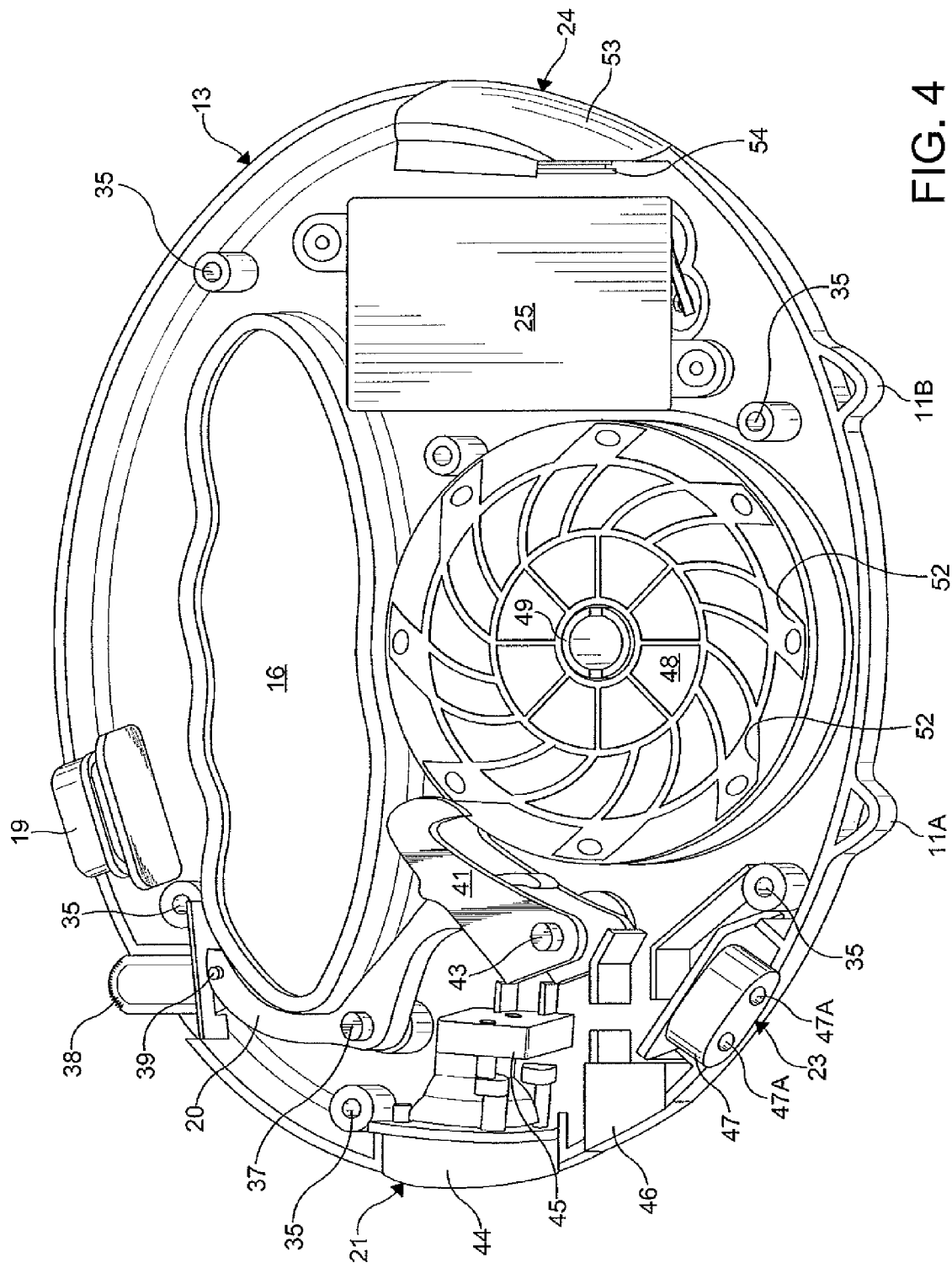
FIG. 4 is a view similar to FIG. 3 with components installed.

There is formed on the interior surface of each of the housing halves 12, 13 a lever pivot post 36 positioned between the hand aperture 16 and the first light aperture 29. The posts 36 each have a bore formed therein for receiving an associated pin 37 (FIG. 4) extending from the lever 20 to form a pivot point at a midpoint of the lever. As shown in FIG. 4, an upper end of the lever 20 has a hollow knob 38 mounted thereon. There is a compression spring (not shown) positioned inside the knob 38 in contact with the lever 20 to bias the knob upwardly. The knob 38 has a pair of pins 39 extending from opposite sides. Each of the pins 39 slides along a bottom surface an associated rib 40 (FIGS. 2 and 3) formed on the interior surface of a respective one of the housing halves 12, 13. At the end of each rib 40 closest to the lever aperture 28 is formed a downwardly opening depression 40A for accepting a corresponding one of the pins 39. Thus, when the knob 38 is closest to the switch aperture 27, the user can slide the knob toward the lever aperture 28 until the spring moves the pins 39 into the depressions 40A to hold the lever 20 when the user removes his/her thumb from the knob.

The lower end of the lever 20 engages a pawl 41 as shown in FIG. 4. There is formed on the interior surface of each of the housing halves 12, 13 a pawl pivot post 42 positioned adjacent to the leash aperture 30. The posts 42 each have a bore formed therein for receiving an associated pin 43 (FIG. 4)

extending from the pawl 41 to form a pivot point at one end of the pawl. Thus, pivoting of the lever 20 will produce a pivoting of the pawl 41.

The first light 21 includes a reflector 44 mounted in the aperture 29 and having a cone shaped reflective surface. Mounted at an interior end of the reflector 44 is an LED assembly 45 (FIG. 4) that is exposed through a central aperture in the reflector.

Mounted in the leash aperture 30 is a leash guide 46 to guide the leash 22 out of and into the housing 11. The guide 46 has an arcuate opening through which the leash 22 passes.

The second light aperture 31 receives a second light mount 47 upon which the two LEDs are mounted. Extending through the mount 47 is a pair of apertures 47A (FIG. 4) each receiving one of the LEDs.

As shown in FIG. 4, a reel assembly 48 for receiving the leash 22 is rotatably mounted on a tubular axle 49 extending from the inner surface of the housing right half 13. The reel assembly 48 includes an internal spirally coiled spring (not shown) as is conventional in automatically retracting electrical cord reels (e.g., see U.S. Pat. No. 3,450,369). As shown in FIG. 3, the axle 49 extends through a central aperture of a flat ring shaped sound absorbing pad 50 attached to the inner surface of the housing right half 13. The pad 50 can be formed of any suitable material such as ethylene vinyl acetate (also known as EVA) which is adhesively attached to the housing. A second pad 50 is attached to the inner surface of the housing left half 12 as shown in FIG. 2. A tubular axle retainer 51 extends from the inner surface of the housing left half 12 and through a central aperture of the sound absorbing pad 50. The retainer 51 has an inner diameter greater than an outer diameter of the axle 49 and an internal wall 51A that is received in a slot 49A formed in the wall of the axle 49 for a positive engagement.

As shown in FIG. 4, the reel 48 has a plurality of ratchet teeth 52 formed on a side surface for cooperation with the pawl 41. The pawl 41 has to parallel arms and the arm closer to the inner surface of the housing right half 13 engages a similar plurality of teeth formed on the opposite side surface of the reel 48. When the knob 38 is closest to the switch aperture 27, the pawl 41 is rotated out of engagement with the teeth 52 and the reel 48 is free to rotate on the axle 49. In this position, the leash 22 can be pulled out of the housing 11 and will be automatically retracted if the pulling force is released. When the user slides the knob 38 toward the lever aperture 28, the pawl 41 engages the teeth 52 to prevent rotation of the reel 48 in the retracting direction.

The tail light 24 includes a lens 53 covering a tail light module 54 mounted in the third light aperture 32. The module 54 includes one or more sources of light and can include conventional circuitry (not shown) for flashing the light sources to better attract attention.

The flashlight apparatus 10 of the present invention has an ergonomically designed handle and gripping surface at the hand aperture 16 to minimize fatigue to the user's grip over time. The flashlight 10 of the present invention also eliminates the need to point a single beam intermittently between proximate the user's feet and into the distance. The user can position his/her hand in a natural position while walking or moving while having the first and second light emitting sources 21, 23 project the beams in the desired directions. The flashlight also includes an automatically retracting leash 22 that is manually controlled at the knob 38 to prevent retraction.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A handheld flashlight comprising:
   a housing having a handle for accepting a user's hand to grip and hold said housing;
   a first light emitting source positioned in said housing for projecting a beam of light into a distance in front of the user;
   a second light emitting source positioned in said housing adjacent said first light emitting source for projecting a beam of light toward a surface proximate the user's feet
   a switch for energizing and deenergizing said first light emitting source and said second light emitting source;
   a spring biased reel rotatably mounted in said housing; and
   a leash wound on said reel and having an end extending from said housing between said first light emitting source and said second light emitting source, whereby a portion of said leash can be extended from said housing and said reel will automatically retract said extended leash portion;
   a pawl positioned in said housing for selectively engaging said reel to prevent rotation of said reel in a direction to retract said leash into said housing; and
   a manually actuated lever positioned in said housing for selectively pivoting said pawl into and out of engagement with said reel, said lever having an upper end and a lower end and pivotally connected to said housing by a pin at a midpoint of said lever between the upper end and the lower end, the lower end of said lever engaging said pawl, the upper end of said lever having a knob mounted thereon.

2. The flashlight according to claim 1 wherein said first light emitting source comprises at least one light emitting diode.

3. The flashlight according to claim 1 wherein said second light emitting source comprises at least one light emitting diode.

4. The flashlight according to claim 1 wherein said switch energizes said first light emitting source in a first switch position and energizes said second light emitting source in a second switch position.

5. The flashlight according to claim 1 including a tail light positioned in said housing opposite said first light emitting source to provide additional visibility of the user of the flashlight to people who approach the user from behind.

6. The flashlight according to claim 5 wherein said tail light blinks to increase the visibility of the user to people approaching the user from behind.

7. The flashlight according to claim 5 including a colored lens positioned over said tail light.

8. The flashlight according to claim 1 wherein said housing includes a plurality of raised feet extending from a perimeter of said housing for positioning the flashlight on a surface without rolling or tipping.

9. The flashlight according to claim 1 including a plurality of teeth formed on at least one side surface of said reel for cooperating with said pawl to prevent the rotation of said reel.

10. A handheld flashlight comprising:
    a housing having a handle for accepting a user's hand to grip and hold said housing;
    a first light emitting source positioned in said housing for projecting a beam of light into a distance in front of the user;

a second light emitting source positioned in said housing for projecting a beam of light toward a surface proximate the user's feet;

a tail light positioned in said housing opposite said first light emitting source to provide additional visibility of the user of the flashlight to people who approach the user from behind;

a switch for energizing and deenergizing said first light emitting source, said second light emitting source and said tail light;

a spring biased reel rotatably mounted in said housing;

a leash wound on said reel and having an end extending from said housing, whereby a portion of said leash can be extended from said housing and said reel will automatically retract said extended leash portion;

a pawl positioned in said housing for selectively engaging said reel to prevent rotation of said reel in a direction to retract said leash into said housing; and a manually actuated lever positioned in said housing for selectively pivoting said pawl into and out of engagement with said reel, said lever having an upper end and a lower end and pivotally connected to said housing by a pin at a midpoint of said lever between the upper end and the lower end, the lower end of said lever engaging said pawl, the upper end of said lever having a knob mounted thereon.

11. The flashlight according to claim 10 wherein at least one of said first light emitting source, said second light emitting source and said tail light comprises at least one light emitting diode.

12. The flashlight according to claim 10 wherein said switch has a first position for energizing only said first light emitting source, a second position for energizing both said first light emitting source and said second light emitting source and a third position for energizing all of said first light emitting source, said second light emitting source and said tail light.

13. The flashlight according to claim 10 wherein said tail light blinks to increase the visibility of the user to people approaching the user from behind.

14. The flashlight according to claim 13 including a colored lens positioned over said tail light.

15. The flashlight according to claim 10 wherein said housing includes a plurality of raised feet extending from a perimeter of said housing for positioning the flashlight on a surface without rolling or tipping.

16. The flashlight according to claim 12 including a plurality of teeth formed on at least one side surface of said reel for cooperating with said pawl to prevent the rotation of said reel.

17. A handheld flashlight comprising:

a housing having a handle for accepting a user's hand to grip and hold said housing;

a first light emitting source positioned in said housing for projecting a beam of light into a distance in front of the user;

a second light emitting source positioned in said housing adjacent said first light emitting source for projecting a beam of light toward a surface proximate the user's feet;

a switch for energizing and deenergizing said first light emitting source and said second light emitting source;

a spring biased reel rotatably mounted in said housing;

a leash wound on said reel and having an end extending from said housing through a leash aperture formed in said housing, whereby a portion of said leash can be extended from said housing and said reel will automatically retract said extended leash portion and wherein said leash aperture is positioned between said first light emitting source and said second light emitting source;

a pawl positioned in said housing for selectively engaging said reel to prevent rotation of said reel in a direction to retract said leash into said housing;

a manually actuated lever positioned in said housing for selectively pivoting said pawl into and out of engagement with said reel, said lever having an upper end and a lower end and pivotally connected to said housing by a pin at a midpoint of said lever between the upper end and the lower end, the lower end of said lever engaging said pawl, the upper end of said lever having a knob mounted thereon; and a plurality of teeth formed on said reel for cooperating with said pawl to prevent the rotation of said reel.

* * * * *